(12) United States Patent
Tian

(10) Patent No.: US 12,003,665 B2
(45) Date of Patent: Jun. 4, 2024

(54) SYSTEM AND METHOD FOR ELECTRONICALLY OBTAINING AND DISPLAYING CONTEXTUAL INFORMATION FOR UNKNOWN OR UNFAMILIAR CALLERS DURING INCOMING CALL TRANSMISSIONS

(71) Applicant: MOTOROLA SOLUTIONS, INC., Chicago, IL (US)

(72) Inventor: Yong Tian, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 478 days.

(21) Appl. No.: 17/287,121

(22) PCT Filed: Nov. 20, 2018

(86) PCT No.: PCT/CN2018/116494
§ 371 (c)(1),
(2) Date: Apr. 21, 2021

(87) PCT Pub. No.: WO2020/102992
PCT Pub. Date: May 28, 2020

(65) Prior Publication Data
US 2021/0385325 A1  Dec. 9, 2021

(51) Int. Cl.
*H04M 3/42* (2006.01)
*G06F 3/0481* (2022.01)
*G06F 3/14* (2006.01)

(52) U.S. Cl.
CPC ...... *H04M 3/42068* (2013.01); *G06F 3/0481* (2013.01); *G06F 3/14* (2013.01); *H04M 3/42042* (2013.01)

(58) Field of Classification Search
CPC .... G06F 3/0481; G06F 3/14; H04M 3/42068; H04M 3/42042

(Continued)

(56) References Cited

U.S. PATENT DOCUMENTS 9,172,795 B1    10/2015  Rathod
9,544,431 B2    1/2017   Zhang et al.
(Continued)

FOREIGN PATENT DOCUMENTS

| CN | 101753674 A | 6/2010 |
| CN | 104023324 A | 9/2014 |
| WO | 2015041738 A1 | 3/2015 |

OTHER PUBLICATIONS

The International Search Report and the Written Opinion corresponding patent application No. PCT/CN2018/116494 filed: Nov. 20, 2018, all pages.

*Primary Examiner* — Ahmad F. Matar
*Assistant Examiner* — Jirapon Tulop

(57) ABSTRACT

An incoming call from a source device having a source identifier is received at a receiving device and an indication of and request to accept the incoming call is provided at an output interface of the receiving device. A determination is made of whether this is a first time that the source device has called this receiving device or if the local address book is devoid of the source identifier or any associated contextual information associated with a user of the source device having the source identifier. If so, one or more databases of public safety incident information, call information, registration information, dispatch records, mobile application information, and location information is accessed and contextual information identified from the databases associating the source device with the receiving device. The contextual information is then provided at the receiving device while providing the indication of and request to accept the incoming call.

20 Claims, 5 Drawing Sheets

(58) Field of Classification Search
USPC .......................................................... 370/259
See application file for complete search history.

(56) References Cited

U.S. PATENT DOCUMENTS

| | | | | |
|---|---|---|---|---|
| 9,860,372 | B2 | 1/2018 | Quan | |
| 2012/0155625 | A1* | 6/2012 | Lemke | H04M 3/42042 |
| | | | | 379/142.04 |
| 2012/0250843 | A1* | 10/2012 | Belz | H04M 1/56 |
| | | | | 379/93.17 |
| 2013/0260710 | A1* | 10/2013 | H R | H04M 3/4935 |
| | | | | 455/404.1 |
| 2014/0286484 | A1* | 9/2014 | Ehrlich | H04M 3/436 |
| | | | | 379/142.06 |
| 2015/0140977 | A1* | 5/2015 | Zhang | H04W 4/16 |
| | | | | 455/415 |
| 2019/0238678 | A1* | 8/2019 | White | H04W 4/16 |

* cited by examiner

SYSTEM AND METHOD FOR ELECTRONICALLY OBTAINING AND DISPLAYING CONTEXTUAL INFORMATION FOR UNKNOWN OR UNFAMILIAR CALLERS DURING INCOMING CALL TRANSMISSIONS

This application is a National Stage filing under 35 USC § 371 of co-pending Patent Cooperation Treaty international application having Serial No. PCT/CN2018/116494 (the 'PCT international application') filed on Nov. 20, 2018. This application claims priority to the PCT international application, the entire contents of which are incorporated herein by reference.

BACKGROUND OF THE INVENTION

Tablets, laptops, phones (e.g., cellular or satellite), mobile (vehicular) or portable (personal) two-way radios, and other mobile computing devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such mobile computing devices further comprise, or provide access to, electronic digital assistants (or sometimes referenced as "virtual partners") that can provide the user thereof with valuable information in an automated (e.g., without further user input) or semi-automated (e.g., with some further user input) fashion. The valuable information provided to the user can be based on explicit requests for such information posed by the user via an input (e.g., such as a parsed natural language input or an electronic touch interface manipulation associated with an explicit request) in which the electronic digital assistant may reactively provide such requested valuable information, or can be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that may complete electronic tasks in response to user inputs or on based on some other trigger, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

One problem that frequently arises throughout a workday is that numerous phone calls will be received from unknown or unfamiliar source devices, and the receiving device's user may not have any additional context provided to him or her by the receiving device on which to determine whether the call needs to be answered at this time or not, such as via electronically stored indications of previous interactions or communications. Thus, there exists a need for an improved technical method, device, and system for electronically obtaining and displaying contextual information as a function of the calling and receiving devices for determined unknown or unfamiliar callers during incoming call transmissions.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
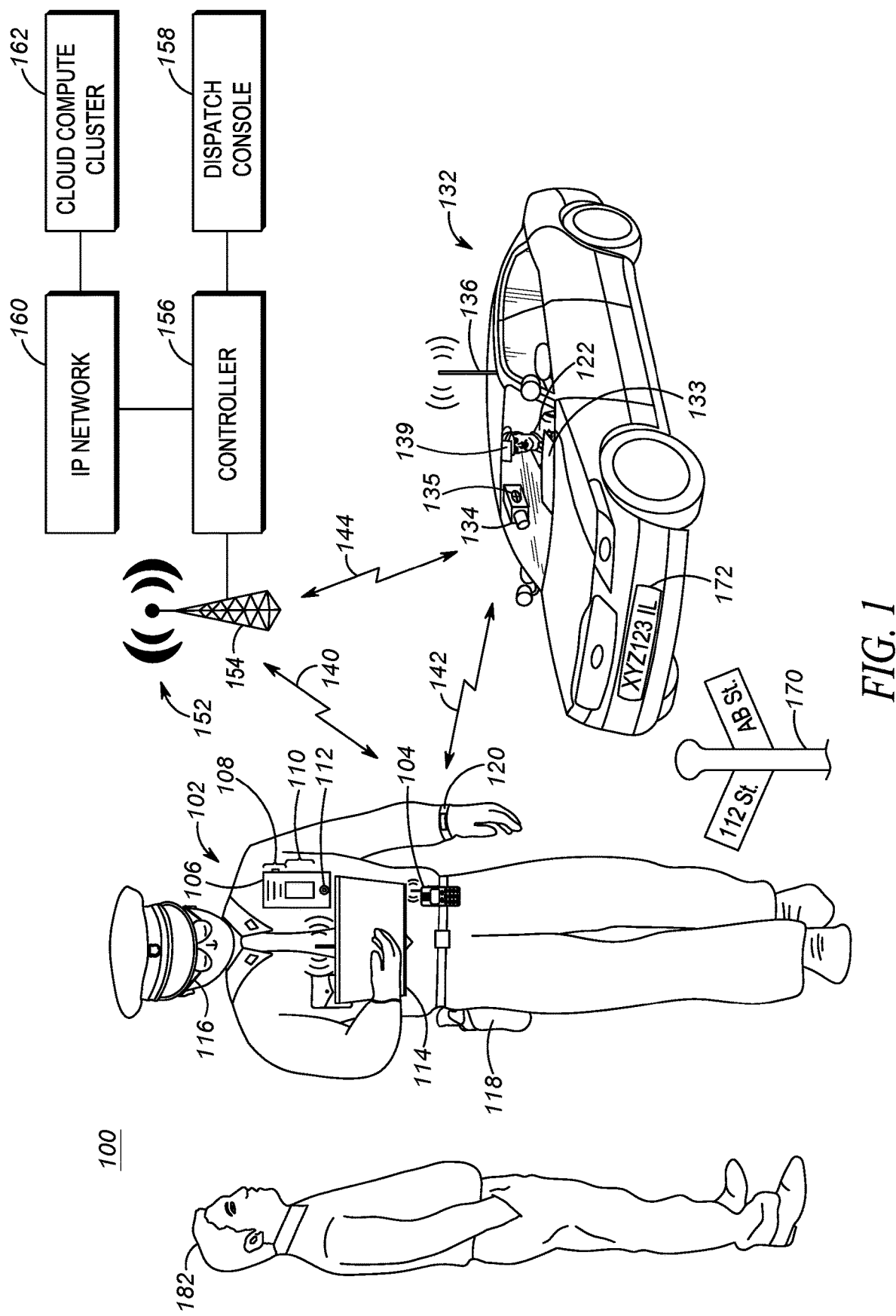
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved technical method, device, and system for an electronic digital assistant to, in response to receiving an incoming call notification from a determined unknown or unfamiliar source, electronically obtain via local and/or remote databases additional contextual information as a function of the identities of the source and receiving devices, and electronically provide such additional contextual information to a user of the receiving device during the incoming call notification event.

In one embodiment, a process for electronically retrieving and displaying contextual information for determined unknown or unfamiliar callers during an incoming call from a source device to a receiving device includes: receiving, at an electronic processor of the receiving device, an incoming call transmission notification signal associated with the incoming call requesting that a call be established between the receiving device and the source device; identifying, by the electronic processor via the incoming call transmission notification signal, a source identifier identifying a network or hardware address associated with the source device initiating the incoming call to the receiving device; providing, by the electronic processor, an indication of the incoming call and a request to accept the incoming call at an output interface of the receiving device, a positive response to which will cause the incoming call to be accepted and allow audio and/or video data captured at one of the receiving device and the source device to be provided to the other of the receiving device and the source device over a wired and/or wireless network communicably connecting the source device to the receiving device; determining, by the electronic processor, that one of (i) this is a first time that the source device having the source identifier has called this receiving device, (ii) a local address book of the receiving device stored at the receiving device does not include the source device having the source identifier, and (iii) the local address book includes the source device having the source identifier but does not include any associated contextual information including a friendly name associated with a user of the source device to aid a second user of the receiving device in identifying the user of the source device, and responsively; accessing, by the electronic processor, one or more local or remote databases of public safety incident information, talkgroup membership and historical talkgroup call information, vehicle registration information, computer aided dispatch (CAD) records, private call historical information, mobile application historical service information, and historical location information; identifying, via the one or more local or remote databases using the source identifier of the source device and a destination identifier of the receiving device, contextual information from the local or remote databases associating the source device with the receiving device; and providing, at one or both of an audio and visual output of the receiving device and while providing the indication of and request to accept the incoming call, the identified contextual information.

In a further embodiment, a receiving device for electronically retrieving and displaying contextual information for determined unknown or unfamiliar callers during an incoming call from a source device to the receiving device includes: a memory; one or more transceivers; an output interface; and one or more processors configured to: receive, via the one or more transceivers, an incoming call transmission notification signal associated with the incoming call requesting that a call be established between the receiving device and the source device; identify, via the incoming call transmission notification signal, a source identifier identifying a network or hardware address associated with the source device initiating the incoming call to the receiving device; provide, via the output interface, an indication of the incoming call and a request to accept the incoming call, a positive response to which will cause the incoming call to be accepted and allow audio and/or video data captured at one of the receiving device and the source device to be provided to the other of the receiving device and the source device over a wired and/or wireless network communicably connecting the source device to the receiving device; determine that one of (i) this is a first time that the source device having the source identifier has called this receiving device, (ii) a local address book of the receiving device stored at the receiving device does not include the source device having the source identifier, and (iii) the local address book includes the source device having the source identifier but does not include any associated contextual information including a friendly name associated with a user of the source device to aid a second user of the receiving device in identifying the user of the source device, and responsively: access one or more local or remote databases of public safety incident information, talkgroup membership and historical talkgroup call information, vehicle registration information, computer aided dispatch (CAD) records, private call historical information, mobile application historical service information, and historical location information; identify, via the one or more local or remote databases using the source identifier of the source device and a destination identifier of the receiving device, contextual information from the local or remote databases associating the source device with the receiving device; and provide, via the output interface and while providing the indication of and request to accept the incoming call, the identified contextual information.

In a still further embodiment, a system for electronically retrieving and displaying contextual information for determined unknown or unfamiliar callers during an incoming call from a source device to a receiving device includes: one or more infrastructure electronic processing devices configured to: receive, at the one or more infrastructure electronic processing devices, an incoming call transmission notification signal associated with the incoming call requesting that a call be established between the receiving device and the source device; identify, by the one or more infrastructure electronic processing devices via the incoming call transmission notification signal, a source identifier identifying a network or hardware address associated with the source device initiating the incoming call to the receiving device and identify, via the incoming call transmission notification signal, a destination identifier identifying a second network or second hardware address associated with the receiving device; determine, by the one or more infrastructure electronic processing devices, that one of (i) this is a first time that the source device having the source identifier has called the receiving device, (ii) an address book of the receiving device stored in the infrastructure does not include the source device having the source identifier, and (iii) the address book of the receiving device stored in the infrastructure includes the source device having the source identifier but does not include any associated contextual information including a friendly name associated with a user of the source device to aid a second user of the receiving device in identifying the user of the source device, and responsively: access, by the one or more infrastructure electronic processing devices, one or more local or remote databases of public safety incident information, talkgroup membership and historical talkgroup call information, vehicle registration information, computer aided dispatch (CAD) records, private call historical information, mobile application historical service information, and historical location information; identify, via the one or more local or remote databases using the source identifier of the source device and the destination identifier of the receiving device, contextual information from the local or remote databases associating the source device with the receiving device; and provide, via one or more wired or wireless infrastructure links, the identified contextual information and a forwarded incoming call notification to the receiving device; and a receiving device having one or more receiving device electronic processing devices configured to: receive, by the one or more receiving device electronic processing devices, the forwarded incoming call notification and the identified contextual information; and provide, by one or more receiving device electronic processing devices via an output interface of the receiving device, a request to accept the incoming call at the output interface of the receiving device, a positive response to which will cause the incoming call to be accepted and allow audio and/or video data captured at one of the receiving device and the source device to be provided to the other of the receiving device and the source device over a wired and/or wireless network communicably connecting the source device to the receiving device.

Each of the above-mentioned embodiments will be discussed in more detail below, starting with example communication system and device architectures of the system in which the embodiments may be practiced, followed by an illustration of processing blocks for achieving the improved technical method, device, and system for an electronic digital assistant. Further advantages and features consistent with this disclosure will be set forth in the following detailed description, with reference to the figures.

1. Communication System and Device Structures a. Communication System Structure

Figure 2:
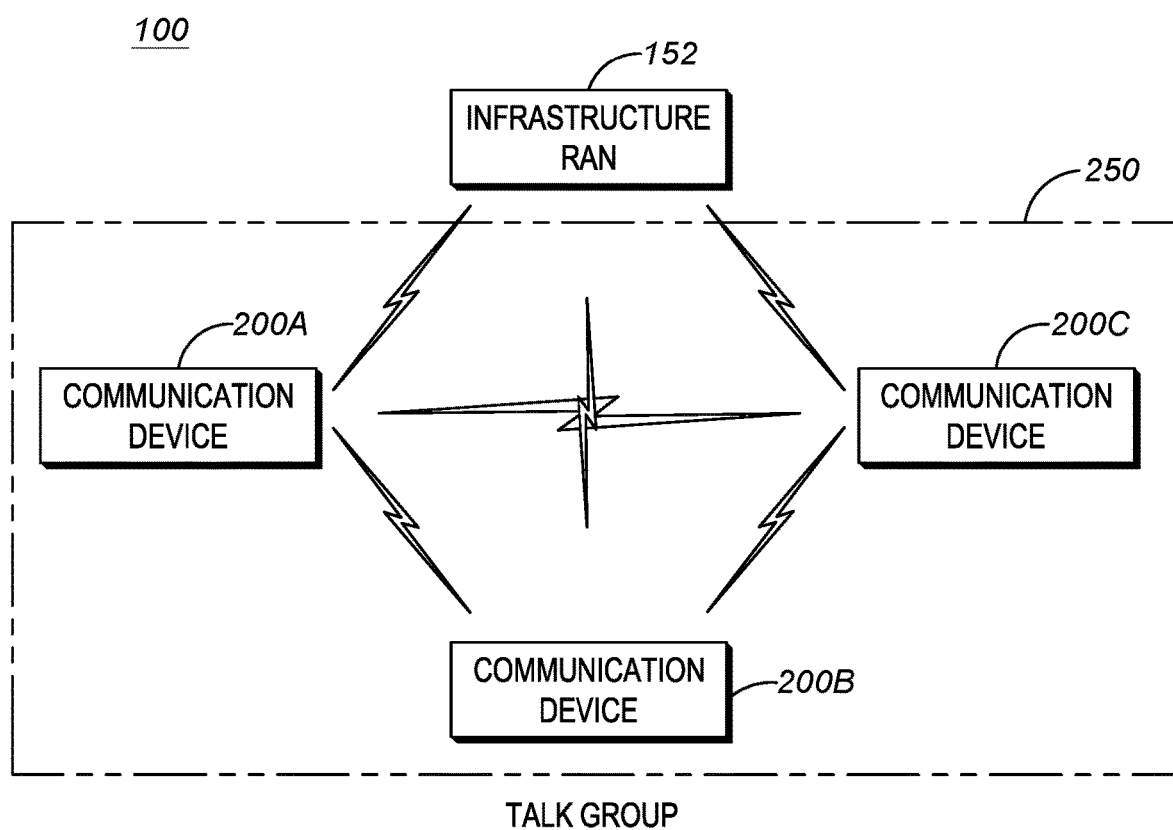
FIG. 2 is a system diagram illustrating a plurality of communication devices of FIG. 1 that are associated with a talk group and that may be located at varying locations, in accordance with some embodiments.

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses, may include a video camera, and/or may include a head-tracking and/or eye-tracking function), sensor-enabled holster 118, and/or biometric sensor wristband 120. Although FIG. 1 illustrates only a single user 102 with a respective first set of devices, in other embodiments, the single user 102 may include additional sets of same or similar devices, and additional users (such as user 182) may be present with respective additional sets of same or similar devices as user 102, as illustrated in FIG. 2. User 182 may be geographically proximate to (or not geographically proximate to) user 182. Audio of users 102 and/or 182 may be captured by devices owned, worn, or associated with user 102 or user 182 as a function of proximity and device ownership.

System 100 may also include a vehicle 132 associated with the user 102 (e.g., the user 102 illustrated as potentially alternatively sitting in a driver's seat position 122 of vehicle 132 in FIG. 1 instead of standing outside of it), or associated with a user 122 entirely different and separate from user 102 (and user 182) but including a same one or more devices and accessories (not illustrated in FIG. 1) as user 102, having an integrated vehicular computing device 133, an associated vehicular video camera 134 and/or microphone 135, a coupled vehicular transceiver 136, and a head and/or eye-tracking device 139. Although FIG. 1 illustrates only a single vehicle 132 with a respective single vehicular computing device 133, single vehicular video camera 134 and single transceiver 136, in other embodiments, the vehicle 132 may include additional same or similar computing devices, video cameras and/or transceivers, and additional vehicles may be present with respective additional sets of computing devices, video cameras, and/or transceivers.

Each of the portable radio 104, RSM video capture device 106, laptop 114, and vehicular computing device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits.

Many of the devices shown in FIG. 1 (such as the portable radio 104, the RSM video capture device 106, the laptop 114, the mobile communication device 133, the infrastructure controller 156, dispatch console 158, and one or more computing devices in the cloud computing cluster 162) may be referred to as communication devices (for example, communication devices 200A, 200B, 200C shown in FIG. 2). Although FIG. 1 shows multiple communication devices associated with the user 102, in some embodiments, the communication system 100 includes communication devices of multiple users.

For example, as shown in FIG. 2, multiple communication devices 200A-200C may form a talk group 250 and may be dispersed across a wide geographic area 251. The communication device 200A may be associated with a first user located at a first location, the communication device 200B may be associated with a second user located at a second location, and the communication device 200C may be associated with a third user located at a third location. The first, second, and third locations may be geographically the same or different from one another.

Further, as shown in FIG. 2, the communication devices 200A, 200B, and 200C are members of the same talk group, i.e., talk group 250. Although not shown in FIG. 2, each of the communication devices 200A, 200B, 200C may also be associated with one or more talk groups other than the talk group 250.

In some embodiments, the communication devices 200A-200C communicate with each other over the infrastructure RAN 152 and/or communicate with each other directly as described herein. Similarly, other devices, such as the dispatch console 158, may communicate with communication devices 200A-200C of multiple users through the infrastructure RAN 152. In some embodiments, one or more users may have multiple associated communication devices, for example, as shown in FIG. 1.

Referring back to FIG. 1, the portable radio 104, in particular, may be any mobile computing device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116 and/or may contain a short-range transmitter (e.g., in comparison to the long-range transmitter such as a LMR or Broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters.

In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106, in particular, provides voice functionality features similar to a traditional RSM, including one or more of acting as a remote microphone that is closer to the user's 102 mouth, providing a remote speaker allowing play back of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other mobile computing devices or to the infrastructure RAN 152. The voice and/or audio played back at the remote speaker may be received from the portable radio 104 or received directly from one or more other mobile computing devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single mobile computing device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may be further provided at the RSM video capture device 106, integrating an ability to capture images and/or video and store the captured image data (for further analysis) or transmit the captured image data as an image or video stream to the portable radio 104 and/or to other mobile computing devices or to the infrastructure RAN 152 directly. The video camera 112 and RSM remote microphone may be used, for example, for capturing audio and/or video of a field-of-view associated with the user 102, storing the captured audio and/or video data for further analysis or transmitting the captured audio and/or video data as an audio and/or video stream to the portable radio 104 and/or to other mobile computing devices or to the infrastructure RAN 152 directly for further analysis. The RSM remote microphone may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, and remote microphone functionality for voice communications in cooperation with portable radio 104.

The laptop 114, in particular, may be any wireless computing device used for infrastructure RAN or direct-mode media communication via a long-range and/or short-range wireless transmitter with other mobile computing devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may be further provided at the laptop 114, integrating an ability to capture video and/or audio of the user 102 and/or a field of view substantially matching the user's 102, and store and/or otherwise process the captured video and/or audio for further analysis or transmit the captured video and/or audio as a video and/or audio stream to the portable radio 104, other mobile computing devices, and/or the infrastructure RAN 152 for further analysis.

The smart glasses 116 may include a digital imaging device, a computing device, a short-range and/or long-range transceiver device, and/or a projecting device. The smart glasses 116 may maintain a bi-directional communications connection with the portable radio 104 and provide an always-on or on-demand video feed pointed in a direction of the user's 102 gaze via the digital imaging device, and/or may provide a personal display via the projection device integrated into the smart glasses 116 for displaying to its user information such as text, images, or video received from the portable radio 104 or directly from the infrastructure RAN 152. In some embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device, while in other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact, may provide an augmented reality interface in which a direct or indirect view of real-world environments in which the user is currently disposed are augmented, i.e., supplemented, by additional computer-generated sensory input such as sound, video, images, graphics, GPS data, or other information, or may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other device in FIG. 1 for that matter) may each include a location determination device integrated with or separately disposed but communicably coupled to the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location (and/or orientation) can then be stored locally and/or transmitted via the transmitter or transceiver to other computing devices and/or to the infrastructure RAN 152.

The vehicle 132 may include the vehicular computing device 133, the vehicular video camera 134 and/or microphone 135, the vehicular transceiver 136, and the head and/or eye-tracking device 139, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with mobile computing devices such as the portable radio 104, the RSM 106, and the laptop 114 via wireless link(s) 142 and/or for wirelessly communicating with the infrastructure RAN 152 via wireless link(s) 144. The vehicular transceiver 136 may further include a short-range wireless transceiver or wired transceiver for communicably coupling between the vehicular computing device 133 and/or the vehicular video camera 134 in the VAN. The vehicular computing device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other mobile computing devices, and/or the infrastructure RAN 152 for further analysis. The omni-directional or unidirectional microphone 135, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

The vehicle 132 may be a human-operable vehicle, or may be a self-driving vehicle operable under control of vehicular computing device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the vehicular computing device 133 and/or transceiver 136 for determining (and storing and/or transmitting) a location (and/or orientation) of the vehicle 132.

In some embodiments, instead of a vehicle 132, a land, air, or water-based drone with same or similar audio and/or video and communications capabilities and same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between, and one of the VAN and the PAN may provide infrastructure communications to the other, depending on the situation and the types of devices in the VAN and/or PAN and may provide interoperability and communication links between devices (such as video cameras) and sensors within the VAN and PAN.

Although the RSM 106, the laptop 114, the smart glasses 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be mobile and may be known as 'mobile stations' or 'mobile devices,' and may include any one or more of the electronic computing devices illustrated in FIG. 1, among other possibilities. At least one other terminal, e.g. used in conjunction with mobile devices, may be a fixed terminal, e.g. a base station, eNodeB, repeater, and/or access point. Such a RAN typically includes a system infrastructure that generally includes a network of various fixed terminals, which are in direct radio communication with the mobile devices. Each of the fixed terminals operating in the RAN may have one or more transceivers which may, for example, serve mobile devices in a given region or area, known as a 'cell' or 'site', by radio frequency (RF) communication. The mobile devices that are in direct communication with a particular fixed terminal are said to be served by the fixed terminal. In one example, all radio communications to and from each mobile device within the RAN are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half-duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Infrastructure narrowband LMR wireless systems, on the other hand, may operate in either a conventional or trunked configuration. In either configuration, a plurality of mobile devices is partitioned into separate groups of mobile devices.

In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

In some instances, broadband and narrowband systems may be interfaced via a middle-ware system that translates between a narrowband PTT standard protocol (such as P25) and a broadband PTT standard protocol (such as OMA-PoC). Such intermediate middle-ware may include a middle-ware server for performing the translations and may be disposed in the cloud, disposed in a dedicated on-premises location for a client wishing to use both technologies, or disposed at a public carrier supporting one or both technologies. For example, and with respect to FIG. 1, such a middle-ware server may be disposed in infrastructure RAN 152 at controller 156 or at a separate cloud computing cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single controller 156 (e.g., radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The controller 156 illustrated in FIG. 1, or some other backend electronic computing device existing on-premises or in the remote cloud compute cluster 162 accessible via the IP network 160 (such as the Internet), may additionally or alternatively operate as a back-end electronic digital assistant, a back-end audio and/or video processing electronic computing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 3, one or more of which may be executing none, all, or a portion of an electronic digital assistant service, sequentially or in parallel, across the plurality of computing devices. The plurality of computing devices comprising the cloud compute cluster 162 may be geographically co-located or may be separated by inches, meters, or miles, and inter-connected via electronic and/or optical interconnects. Although not shown in FIG. 1, one or more proxy servers or load-balancing servers may control which one or more computing devices perform any part or all of the electronic digital assistant function.

System 100 may additionally include a physical street sign 170 that defines a geographic location, such as an intersection sign, that includes alphanumeric text and/or images that may identify, for example, two cross streets meeting one another at or near the location of the street sign 170. The license plate 172 may be a physical or electronic display attached to the vehicle 132 that includes a unique identifier to uniquely identify (e.g., within a local region or area, county, city, state, or country) the vehicle 132 and may be linked to other information such as an owner, mobile device, driver, employee, licensee, company, insurance information, traffic infraction information, make and/or model of the vehicle, or other information associated with the vehicle. The street sign 170 and the license plate 172 are merely example contextual elements that will be described in more detail below with respect to the process 400 of FIG. 4.

Finally, although FIG. 1 describes a communication system 100 generally as a public safety communication system including a user 102 generally described as a police officer and vehicle 132 generally described as a police cruiser, in other embodiments, the communications system 100 may additionally or alternatively be a retail communications system including a user 102 that may be an employee of a retailer and a vehicle 132 that may be a vehicle for use by the user 102 in furtherance of the employee's retail duties (e.g., a shuttle or self-balancing scooter). In other embodiments, the communications system 100 may additionally or alternatively be a warehouse communications system including a user 102 that may be an employee of a warehouse and a vehicle 132 that may be a vehicle for use by the user 102 in furtherance of the employee's retail duties (e.g., a forklift).

In still further embodiments, the communications system 100 may additionally or alternatively be a private security communications system including a user 102 that may be an employee of a private security company and a vehicle 132 that may be a vehicle for use by the user 102 in furtherance of the private security employee's duties (e.g., a private security vehicle or motorcycle). In even further embodiments, the communications system 100 may additionally or alternatively be a medical communications system including a user 102 that may be a doctor or nurse of a hospital and a vehicle 132 that may be a vehicle for use by the user 102 in furtherance of the doctor or nurse's duties (e.g., a medical gurney or ambulance). In a last example embodiment, the communications system 100 may additionally or alternatively be a heavy machinery communications system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, or front loader). Still other possibilities exist as well.

b. Device Structure

Figure 3:
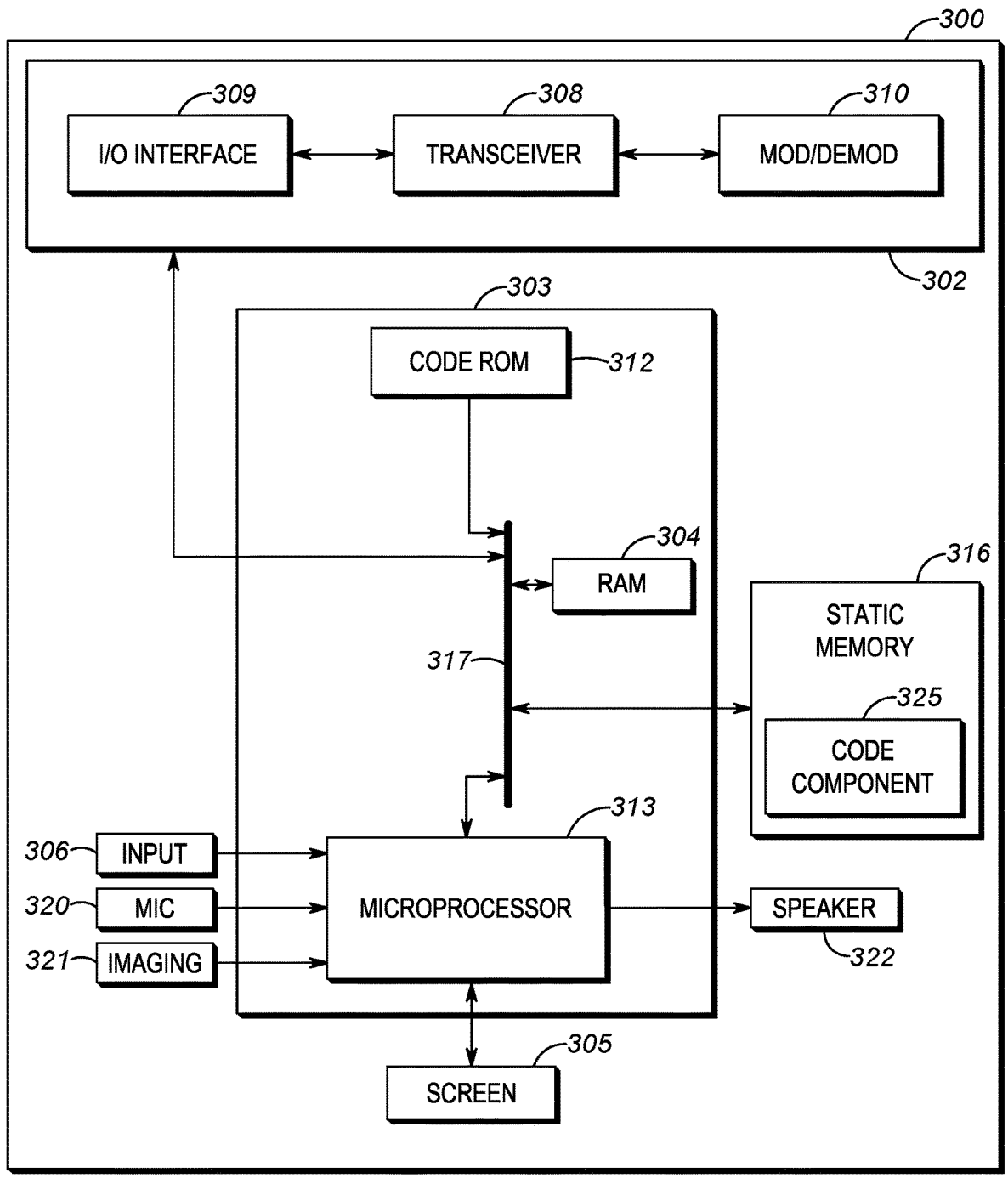
FIG. 3 is a device diagram showing a device structure of an electronic computing device for operating an electronic digital assistant, in accordance with some embodiments.

FIG. 3 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud computing cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 3 may represent the communication devices 200A-200C and other devices as described above with respect to FIGS. 1 and 2, depending on the type of the communication device, the communication device 200 or other devices may include fewer or additional components in configurations different from that illustrated in FIG. 3. For example, in some embodiments, the communication device 200 acting as the infrastructure controller 156 of FIG. 1 may not include one or more of the screen 305, microphone 320, imaging device 321, and speaker 322. As another example, in some embodiments, the communication device 200 acting as the portable radio 104 of the RSM video capture device 106 of FIG. 1 may further include a location determination device (for example, a global positioning system (GPS) receiver) as explained above. Other combinations are possible as well.

As shown in FIG. 3, the communication device 300 includes a communications unit 302 coupled to a common data and address bus 317 of a processing unit 303. The communication device 300 may also include one or more input devices (for example, keypad, pointing device, touch-sensitive surface, button, a microphone 320, an imaging device 321, and/or another input device 306) and an electronic display screen 305 (which, in some embodiments, may be a touch screen and thus also acts as an input device), each coupled to be in communication with the processing unit 303.

The microphone 320 may be present for capturing audio from a user and/or other environmental or background audio that is further processed by processing unit 303 in accordance with the remainder of this disclosure and/or is transmitted as voice or audio stream data, or as acoustical environment indications, by communications unit 302 to other portable radios and/or other communication devices. The imaging device 321 may provide video (still or moving images) of an area in a field of view of the communication device 300 for further processing by the processing unit 303 and/or for further transmission by the communications unit 302. A speaker 322 may be present for reproducing audio that is decoded from voice or audio streams of calls received via the communications unit 302 from other portable radios, from digital audio stored at the communication device 300, from other ad-hoc or direct mode devices, and/or from an infrastructure RAN device, or may playback alert tones or other types of pre-recorded audio.

The processing unit 303 may include a code Read Only Memory (ROM) 312 coupled to the common data and address bus 317 for storing data for initializing system components. The processing unit 303 may further include an electronic processor 313 (for example, a microprocessor or another electronic device) coupled, by the common data and address bus 317, to a Random Access Memory (RAM) 204 and a static memory 316.

The communications unit 302 may include one or more wired and/or wireless input/output (I/O) interfaces 309 that are configurable to communicate with other communication devices, such as the portable radio 104, the laptop 114, the wireless RAN 152, and/or the mobile communication device 133, over which incoming calls may be received and over which communications with remote databases and/or servers may occur.

For example, the communications unit 302 may include one or more wireless transceivers 308, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310.

The electronic processor 313 has ports for coupling to the display screen 305, the microphone 320, the imaging device 321, the other input device 306, and/or the speaker 322. Static memory 316 may store operating code 325 for the electronic processor 313 that, when executed, performs one or more of the blocks set forth in FIG. 4 and the accompanying text. The static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

Figure 4:
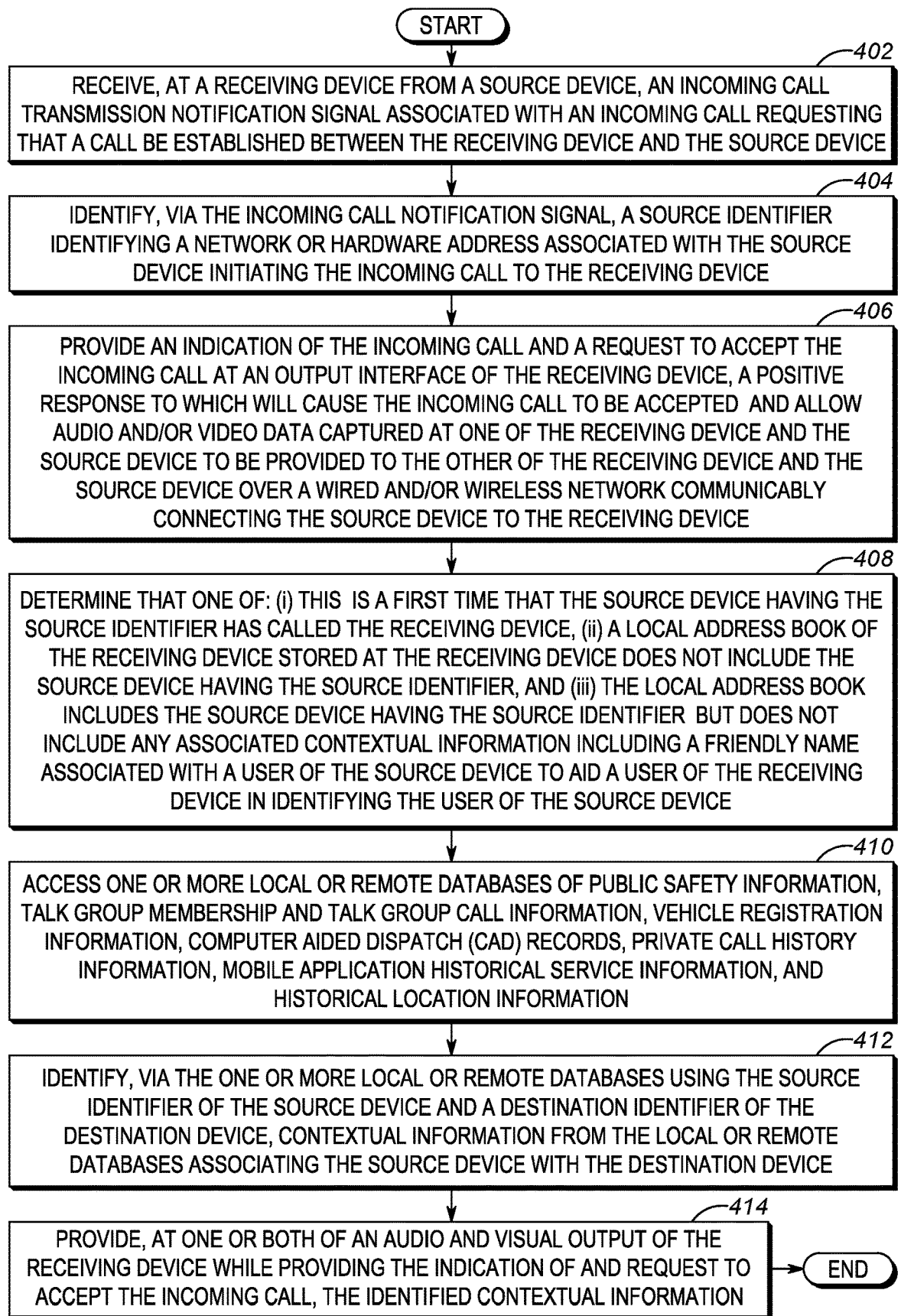
FIG. 4 illustrates a flowchart setting forth process blocks for operating the electronic digital assistant of FIGS. 1 and/or 3, in accordance with some embodiments.

2. Processes for Electronically Obtaining and Displaying Contextual Information for Unknown or Unfamiliar Callers During Incoming Call Transmissions FIG. 4 illustrates a flow chart diagram of a process 400 performed by an electronic computing device (acting as a receiving device for an incoming call and may thus hereinafter be alternatively referred to as a 'receiving device') for electronically obtaining and displaying contextual information for unknown or unfamiliar callers during incoming call transmissions. The electronic computing device performing one or more of the blocks set forth in FIG. 4 may include, as just examples, the portable radio 104, the RSM video capture device 106, the laptop 114, or the vehicular computing device 133 of FIG. 1. Other example portable computing devices are possible as well, including mobile computing devices such as so-called smart phones operating on an Apple iOS™ or Google Android™ operating system. While a particular order of processing steps or blocks, message receptions, and/or message transmissions is indicated in FIG. 4 as an example, timing and ordering of such blocks, receptions, and transmissions may vary where appropriate without negating the purpose and advantages of the examples set forth in detail throughout the remainder of this disclosure.

Process 400 begins at block 402, where the electronic computing device receives, from a source device, an incoming call transmission notification signal associated with an incoming call requesting that a call be established between the receiving device and the source device.

For example, the user 182 of FIG. 1 may have a laptop same or similar to laptop 114 and may manipulate a calling application on the laptop to initiate a voice or multimedia call to user 102 by selecting a device identifier on the calling application associated with the laptop 114 of user 102, which may then cause a signal to be transmitted via wireless link 140 to a controller 156, which may in turn cause an incoming call transmission notification signal to be sent to laptop 114 (acting as the electronic computing device of process 400) over the same wireless link 140 or a different wireless link.

As another example, a user such as user 182 in possession of communication device 200C of FIG. 2 may depress a PTT button while a talkgroup associated with talkgroup 250 is selected on the communication device 200C, which may then cause a signal to be transmitted via a wireless link directly to each of the communication devices 200A (acting as the electronic computing device of process 400) and 200B, or which may then cause a signal to be transmitted via a wireless link indirectly to infrastructure RAN 152 which may in turn cause (via a controller such as controller 156) an incoming group call (also referred to herein as a talkgroup call) transmission notification signal to be sent to each of the communication devices 200A and 200B over a wireless link.

The incoming call transmission notification signal itself or an associated incoming call data packet transmitted accompanying or prior to or subsequent to the incoming call transmission notification signal, may include information associated with the incoming call, such as a source identifier for uniquely identifying the source device that initiated the call (for both private calls and group calls), a unique identifier for identifying the call perhaps generated by the source device or an intervening infrastructure device/controller, an identity of a device that has been granted a floor (for group calls), authentication information for authenticating an identity of the source device or other persons or intervening devices or networks, or encryption information for decrypting contents of the call including any of the information set forth herein, among other information. For a group or talkgroup call, two different types of incoming call transmission notification signals may be received, including an initial incoming call transmission notification signal when a user in the talkgroup first keys up and that identifies the device that first keyed up, and a subsequent incoming call transmission notification signal for the same existing talkgroup call when, for example, a new user in the same talkgroup pushes his or her PTT button during a call hangtime (after the first user is done talking and releases his or her PTT button) and that identifies the new device granted a floor in the same existing group or talkgroup call.

At block 404, the electronic computing device identifies, via the incoming call notification signal or the associated incoming call data packet, the source identifier identifying a network or hardware address associated with the source device. A hardware address may be, for example, a medium access layer (MAC) address, an equipment serial number (ESN), an International Mobile Equipment Identity (IMEI), or a mobile equipment identifier (MEID) that uniquely identifies the source device hardware amongst all other hardware devices or al other hardware devices of that type. A network address may be, for example, a temporary identifier temporarily (for minutes, hours, days, months, or years) assigned by a communications network to a particular unique source device hardware that uniquely identifies the source device on the communications network on which it currently operates but perhaps not globally across all communications networks and may include, for example, a mobile identification number (MIN), a mobile subscription identification number (MSIN), or a mobile directory number (MDN). In some embodiments, only one of a hardware or network address may be received at the electronic computing device at block 402 and/or identified at block 404, while in other embodiments, both a hardware and a network address of the source device may be received at the electronic computing device at block 402 and identified at block 404. At block 404, the electronic computing device may extract the received hardware and/or network address from the incoming call notification signal and store the extracted hardware and/or network address in RAM such as RAM 304 or static memory such as static memory 316 of FIG. 3 for further use and/or manipulation.

In some embodiments, at block 404, the electronic computing device may use the network or hardware identifier included in the incoming call notification signal to lookup other network identifiers or other hardware identifiers that similar identify the same source device. For example, the incoming call notification signal may identify a MIN associated with the source device, and the electronic computing device may access a local or remote mapping that, provided the MIN, also provides other network identifiers currently or previously associated with the same source device and/or also provides other hardware identifiers (such as a IMEI) currently or previously associated with the same source device. The electronic computing device may then use these additional identifiers in subsequent steps to locate additional contextual information that associates the additional identifiers, among other possibilities.

Process 400 then proceeds to block 406, where the electronic computing device provides an indication of the incoming call and a request to accept the incoming call at an output interface of the electronic computing device, a positive response to which will cause the incoming call to be accepted and allow audio and/or video data captured at one (e.g., via a unidirectional or half duplex connection) or both (e.g., via a bi-directional or full-duplex connection) of the receiving device and the source device to be provided to the other of the receiving device and the source device over a wired and/or wireless network communicably connecting the source device and the receiving device.

Figure 5:
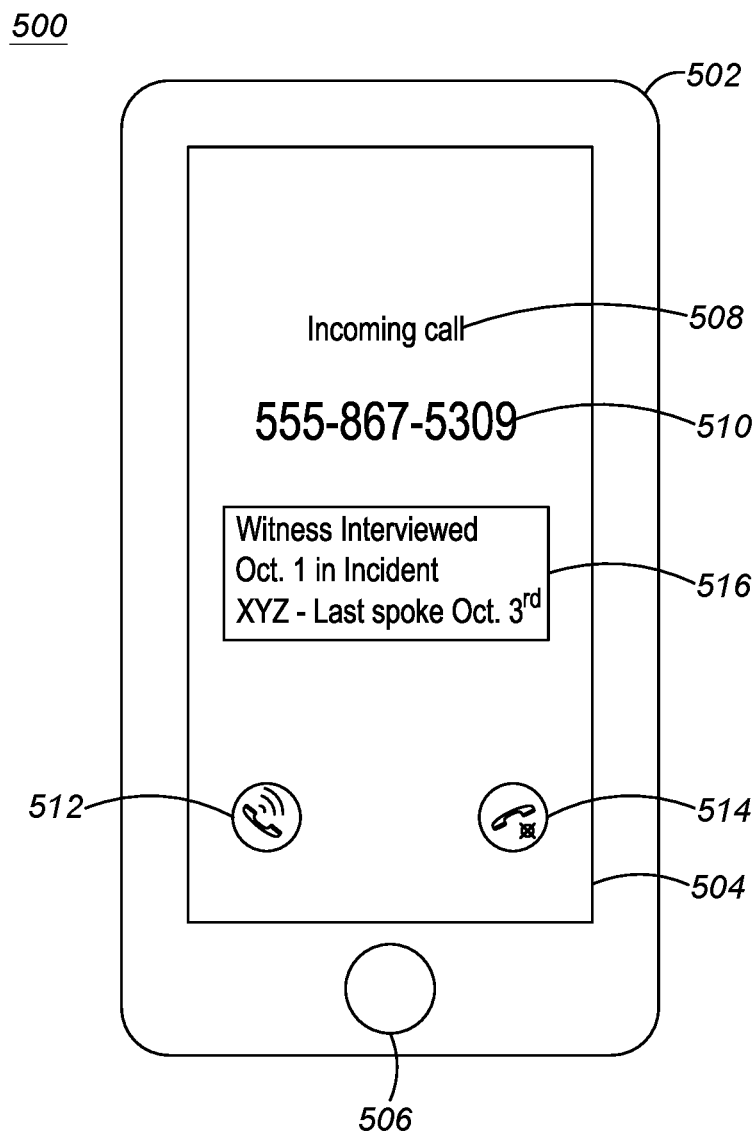
FIG. 5 illustrates an example user interface that is modified to display electronically obtained source and receiving device contextual information during an incoming call notification event, in accordance with some embodiments.

For example, and now referencing FIG. 5, an example electronic computing device 500 in the form of a mobile telephone device 502 is illustrated, including a display portion 504 and a home button 506. The mobile telephone device 502 may have an underlying structure same or similar to the communication device 300 described with respect to FIG. 3.

As shown in FIG. 5, an indication of an incoming call 508 is provided at an output interface (display portion 504 which may correspond, for example, to display screen 305 of FIG. 3) and a request to accept the call provided via a displayed call accept button 512, operation of which would establish the requested call and allow a user of the mobile telephone device 502 to capture audio and/or video by a microphone input (such as microphone 320 of FIG. 3) and/or an imaging input (such as imaging 321 input of FIG. 3) and provide the captured input to the source device over an intervening wired and/or wireless network connecting the source device to the mobile telephone device 502, or operation of which may alternatively or additional allow a user of the source device (not illustrated) to capture audio and/or video by a microphone input and/or an imaging input and provide the captured input to the mobile telephone device 502 over an intervening wired and/or wireless network connecting the source device to the mobile telephone device 502 and which may be reproduced by a speaker output (such as speaker 322 of FIG. 3) and/or a display (such as display portion 504 of FIG. 5) of the mobile telephone device 502.

In the example shown in FIG. 5, the mobile telephone device 502 is further configured to display the network or hardware address of the source device (in this case, a phone number of MDN of the source device) as shown via the displayed source device phone number 510 of 555-867-5309. In some embodiments, the network or hardware address may not be shown, or some other network or hardware address may be shown in place of or in addition to the type of network or hardware address illustrated in FIG. 5.

Furthermore, the mobile telephone device 502 illustrated in FIG. 5 may provide an incoming call decline button 514, which may be displayed accompanying the indication of the incoming call and may allow a user of the mobile telephone device 502 to prematurely end the indication of the incoming call and may cause the mobile telephone device 502 to transmit a corresponding incoming call decline notification back to the infrastructure and/or back to the source device indicating that the user declined the incoming call or that the call could not be completed, in which case neither the source device nor the mobile telephone device 502 are able to transmit audio and/or video for receipt by the other device.

Process 400 then proceeds to block 408, where the electronic computing device determines that one of (i) this is a first time that the source device having the source identifier has called this electronic computing device, (ii) a local address book of the electronic computing device stored at the electronic computing device does not include the source device having the source identifier, and (iii) the local address book includes the source device having the source identifier but does not include any associated contextual information (i.e., beyond the network and/or hardware address of the source device) including a friendly name associated with a user of the source device to aid a second user of the receiving device in identifying the user of the source device.

In a first example at block 408, the electronic computing device determines that this is a first time that the source device having the source identifier has called this electronic computing device. The electronic computing device may determine that this is a first time that the source device having the source identifier has called this electronic computing device in a number of different ways. In one embodiment, the electronic computing device may maintain a call history log stored at the electronic computing device and, at block 408, attempt to find a match between the source identifier (the only source identifier or any source identifier if multiple are provided) from the incoming call transmission notification signal and source identifier(s) stored in the call history log. When no match can be found, the electronic computing device may conclude that this is a first time that the source device having the source identifier has called this electronic computing device. In some embodiments where every source device calling the electronic computing device is automatically added to a locally stored address book at the electronic computing device, the call history log may be the locally stored address book, while in other embodiments, they may be separate data structures.

In another embodiment, an infrastructure device such as controller 156 (perhaps with access to local storage or to storage at the cloud computer cluster 162) or the source device itself may similarly maintain a call history log and determine, based on the source identifier and a destination identifier identifying a network or hardware address associated with the receiving device/electronic computing device, that this is a first time that the source device having the source identifier has called this electronic computing device and may provide an indication as much to the electronic computing device in the incoming call notification signal or associated data packet prior to or subsequent to the incoming call notification signal, and which the electronic computing device may recognize and use to make the determination set forth in block 408.

In a still further embodiment, where the receiving device is a dispatch console at a dispatch center or call taking position in a public safety answering point (PSAP), the destination identifier may be a network identifier of the dispatch center or PSAP or may be a network or hardware identifier of the individual dispatch console or call taking position, or in other embodiments, may be the network identifier of the dispatch center or PSAP as further modified by a particular dispatch console position or identifier or PSAP call taking position or identifier, so that a source device first time calling a first dispatch console or first PSAP call taking position may still be treated as a first time caller when calling a second dispatch console or second PSAP call taking position different from the first (but still within the same dispatch center or PSAP and perhaps having a same network address such as 9-1-1). Other possibilities exist as well.

In a second example at block 408, the electronic computing device determines that a local address book of the electronic computing device stored at the electronic computing device does not include the source device having the source identifier. For example, the electronic computing device may maintain a local address book of various device identifiers that enable the user of the electronic computing device to initiate calls to or send text messages to or take other actions with respect to a known device of another user. Typically, such device identifiers are network addresses that are relatively shorter and easier to remember than hardware addresses, and may include, for example, MINS, MSINs, or MDNs. However, hardware addresses such as MACs, ESNs, IMEIs, or MEIDs could be used additionally or alternatively. Such network and hardware addresses typically are made up of random amalgamations of alphanumeric characters and/or numbers that do not form any recognizable English (or any other language) term or name of any person, organization, or business.

Such electronically stored address books may be stored in a RAM such as RAM 304 of communication device 300 of FIG. 3 or a static memory 316 of communication device 300, and may contain such additional fields as a friendly alphanumeric name associated with the device identifier that identifies a business or person (or talkgroup or unit or organization for group-based identifiers) associated with the device identifier, a street address associated with the device identifier, or other information useful in mapping the device identifier to a user, business, or organization associated with the device identifier. Such friendly alphanumeric names may be a first and/or last name, a business name, an organizational name, or some other identifier that a user of the electronic computing device can easily identify and determine a user, group of users, business, or organization associated with the device identifier. Such local address books typically maintain mappings between a plurality of device identifiers (e.g., on the order of tens, hundreds, or thousands device identifiers) and a plurality of friendly alphanumeric name (e.g., similarly on the order of tens, hundreds, or thousands of different respective friendly alphanumeric names).

In one embodiment, determining that the local address book of the electronic computing device stored at the electronic computing device does not include the source device having the source identifier comprises accessing the local address book stored at the electronic computing device and failing to find a match between the source identifier (e.g., single or multiple source identifiers) from the incoming call transmission notification signal and device identifiers stored in the local address book.

In another embodiment, an infrastructure device such as controller 156 (perhaps with access to local storage or to storage at the cloud computer cluster 162) may similarly maintain an address book for the electronic computing device and determine, based on the source identifier, that the source device is not present in the (remotely stored) address book associated with the electronic computing device and may provide an indication as much to the electronic computing device in the incoming call notification signal or associated data packet prior to or subsequent to the incoming call notification signal, and which the electronic computing device may recognize and use to make the determination set forth in block 408. Other possibilities exist as well.

In a third example at block 408, the electronic computing device may access the local address book and determine that the local address book includes the source device having the source identifier but does not include any associated contextual information including a friendly name associated with a user or users (person, business, or organization) of the source device to aid a second user of the electronic computing device in identifying the user (person, business or organization) of the source device. As set forth earlier, such a condition may exist where the source device has called the electronic computing device in the past and the electronic computing device may have automatically added the source identifier of the source device to its address book, but the user of the electronic computing device has not entered any information (or perhaps nor as the electronic computing device auto-populated any other contextual data under control of other applications such as social media applications or white pages applications) that would help identify a user of the source device, such as a friendly name that could identify person(s), business(es), or organization(s) associated with the source identifier of the source device.

In one embodiment then, determining that the local address book includes the source device having the source identifier but does not include any associated contextual information including friendly name information associated with the user(s) of the source device for help in identifying the user(s) of the source device includes accessing the local address book stored at the electronic computing device, finding a match between the source identifier from the incoming call transmission notification signal and a particular device identifier stored in the local address book, and subsequently failing to locate any additional stored contextual information beyond the device identifier including, but not limited to, friendly name information associated with the matching device identifier in the local address book.

In another embodiment, an infrastructure device such as controller 156 (perhaps with access to local storage or to storage at the cloud computer cluster 162) may similarly maintain an address book for the electronic computing device and determine, based on the source identifier, that the device identifier of the source device is present in the (remotely stored) address book associated with the electronic computing device but that no additional associated contextual information is present in the remotely stored address book, and may provide an indication as much to the electronic computing device in the incoming call notification signal or associated data packet prior to or subsequent to the incoming call notification signal, and which the electronic computing device may recognize and use to make the determination set forth in block 408. Other possibilities exist as well.

As a result of any one of the various alternatives set forth in block 408, the electronic computing device receiving the incoming call is limited to merely providing a display (or other user-perceptible output, such as an audio output) of the received network and/or hardware address of the source device such as that address 510 shown in FIG. 5, which may be insufficient to inform a user of the electronic computing device (in this case the mobile device 502) of an identity of or past interaction or association with a user(s) of the source device.

Subsequent to block 408, process 400 proceeds to blocks 410 and 412, where the electronic computing device accesses one or more local or remote databases of public safety incident information, talkgroup membership and historical talkgroup call information, vehicle registration information, computer aided dispatch (CAD) records, private call historical information, mobile application historical service information, and historical location information (block 410) and identifies, via the one or more local or remote databases using the source identifier of the source device and a destination identifier of the receiving device/electronic computing device, contextual information from the local or remote databases associating the source device with the receiving device (block 412). The electronic computing device may access such databases locally, such as perhaps pre-stored at the electronic computing device and/or periodically updated over-the-air or via a wired connection when the device is docked for charging, or may access such databases remotely, such as via one of the wireless links 140, 142, 144 of FIG. 1 or wireless links set forth in FIG. 2, among other possibilities, for accessing a remote database perhaps stored at a controller 156, at a dispatch console 158 of a public-safety answering point (PSAP), at a cloud computer cluster 162, or at another mobile communication device 200A-C.

In some embodiments, and where the incoming call is being provided over an established data channel such an via a VoIP or PoC session over an LTE channel and via an LTE interface of the electronic computing device, the remote databases may be accessed by piggy-backing an additional data session onto the already established LTE channel. In embodiments where the incoming call is being provided over an established LMR channel, embedded signaling may be leveraged or voice frames may be stolen to provide a low-bandwidth channel sufficient to transmit the database request and receive results. In other embodiments, an additional or separate wired or wireless interface may be used to access the remote databases, such as when the incoming call is being provided over an established DMR channel and DMR interface of the electronic computing device, the databases may be accessed via a separate LTE or WiFi channel and corresponding interface of the electronic computing device. Other possibilities and combinations are possible as well.

Similar to the description set forth above with respect to the source identifier of the source device, in some embodiments, the electronic computing device may use the network or hardware identifier included in the incoming call notification signal to lookup other network identifiers or other hardware identifiers that similar identify the same source device. For example, the incoming call notification signal may identify a MIN associated with the source device, and the electronic computing device may access a local or remote mapping that, provided the MIN, also provides other network identifiers currently or previously associated with the same source device and/or also provides other hardware identifiers (such as a IMEI) currently or previously associated with the same source device. In other embodiments, and where such additional identifiers are stored locally in a volatile or non-volatile memory or ROM, the receiving device may simply retrieve the additional identifiers from the local memory or ROM. The electronic computing device may then use these additional identifiers in this and/or subsequent steps to locate additional contextual information that associates the additional identifiers, among other possibilities.

In one example, the electronic computing device may access a local or remote database of public safety incident information or CAD records using the source identifier, or a determined identity of the user of the source device (perhaps determined via a local or remote device to user mapping for instances where additional context beyond source device user identification is desired), and a device identifier associated with the electronic computing device, or an identity of a user of the electronic computing device (perhaps determined via local storage or via a local or remote device to user mapping and for the purpose of finding additional contextual information matches via the local or remote databases), to identify one or more incidents contained in the public safety incident information or CAD records in which both the source identifier, or the determined identity of the user of the source device, and the electronic computing device identifier, or the identity of the user of the electronic computing device, occur in a same incident record, and identify additional contextual information from the same public safety incident record or CAD record.

As one particular example with reference to FIG. 1, a public safety incident record may indicate that an officer such as officer user 102 having an associated radio device 104 may have interviewed and taken the statement of a witness user 182 having an associated mobile device (not shown in FIG. 1) at a location at the corner of 112 St. and AB St. as shown on the street sign 170. The public safety incident record may include the device identifier identifying the mobile device of the interviewed witness user 182 (e.g., such as the witnesses' mobile device MIN) and the device identifier identifying the radio device 104 of the officer user 102 taking the interview, along with the additional contextual information of the location as shown on the street sign 170 and perhaps additional contextual information such as the identity of the incident type (such as a theft) and/or the incident perpetrator (e.g., such as a name of the suspected thief). The CAD record may alternatively maintain a record that the witness user 182 used his or her associated mobile device (and including the device identifier of the mobile device such as the MIN) to call a pubic-safety answering point (PSAP) and report a theft at the location shown on the street sign 170, and that the officer user 102 (and including a device identifier of his or her associated radio device 104) was dispatched to the location shown on the street sign 170.

In either case, and at some later time when the witness user 182 may call the officer user 102, the electronic computing device in the radio device 104 may access the respective public safety incident record or CAD record at block 410 using the device identifiers of the source device (mobile device of the witness user 182 in this case) and the electronic computing device (officer user's 102 radio device 104 in this case). The electronic computing device may then identify, at block 412, the contextual information from the respective public safety incident record (e.g., the location, incident type, name/description of the perpetrator, time of day of the incident, the date of the incident, a role such as actual or potential witness or suspect, 911 caller, medical professional, laboratory analyst, etc. of the witness user 182 of the source device indicated in the record, a role such as interviewing officer, investigator, fireman, medical professional, CAD operator, etc. of the officer user 102 having the radio device 104) or from the CAD incident record (e.g., the location dispatched to, the time of day of the witnesses phone call/officer's dispatch, the date of the witnesses phone call/officer's dispatch, the identity or name or position of the PSAP call taker or dispatch center dispatch console involved in the incident, role information associated with the witness user 182 and/or the officer user 104 as noted above, etc.) that associates the source device and the electronic computing device (the receiving device in this case).

In a further example, the electronic computing device may access a local or remote database of talkgroup call and membership information or private call history information using the source identifier, or a determined identity of the user of the source device, and a device identifier associated with the electronic computing device, or an identity of a user of the electronic computing device, to identify one or more talkgroup or private call records in which both the source identifier, or the determined identity of the user of the source device, and the electronic computing device identifier, or the identity of the user of the electronic computing device, occur in a same record, and identify additional contextual information such as talkgroup membership of a talkgroup call including the source device and the electronic computing device, date and time of one or more prior talkgroup or private calls including the source device and the electronic computing device, a location of one or both of the source device and the electronic computing device at the date and time of the one or more prior talkgroup or private calls including the source device and the electronic computing device, and a duration of the one or more prior talkgroup or private calls including the source device and the electronic computing device.

As one particular example with reference to FIG. 1, a local or remote database of talkgroup call and membership information may indicate that an officer such as officer user 102 having an associated radio device 104 may have been a member of a same talkgroup with a mutual aid officer user 182 having an associated mobile device (not shown in FIG. 1). For example, officer user 182 may have been an officer from a different agency from officer user 102 providing mutual aid to an incident at an incident location at an intersection of 112 St. and AB St. indicated by street sign 170. The local or remote database of talkgroup call and membership information may include a historical record of the dynamically formed talkgroup for responding to the incident, and may include the device identifier identifying the mobile device of the mutual aid officer user 182 and the device identifier identifying the radio device 104 of the officer user 102, perhaps along with additional contextual information such as the location as shown on the street sign 170, the identity of the incident type (such as a theft), the identity of all of the mutual aid agencies at the incident and present in the formed talkgroup, time(s) and/or date(s) at which the talkgroup was formed and/or dissolved, other talkgroup membership information identifying other devices and/or users present in the talkgroup, and/or talkgroup transcript information containing voice-to-text or text-messaging contents of communications communicated within the talkgroup, among other possibilities.

In any event, and at some later time when the mutual aid officer user 182 may call the officer user 102, the electronic computing device in the radio device 104 may access the respective local or remote database of talkgroup call and membership information at block 410 using the device identifiers of the source device (mobile device of the mutual aid officer user 182 in this case) and the electronic computing device (officer user's 102 radio device 104 in this case). The electronic computing device may then identify, at block 412, the contextual information from the local or remote database of talkgroup call and membership information (e.g., the time and/or date of the formed talkgroup, the duration of the formed talkgroup, the location at which the talkgroup was formed, the incident with which the talkgroup was formed, name/identity of other talkgroup participants, transcript of the talkgroup communications, etc.) that associates the source device and the electronic computing device.

In a still further example, the electronic computing device may access a local or remote database of property ownership registration information using the source identifier, or a determined identity of the user of the source device, to identify property associated with the source identifier, such as a house (by street address or unique housing number) or vehicle (by vehicle identification number (VIN) or license plate number) registered to the identified user of the source device or otherwise recorded as associated with the source identifier. Subsequently, the uniquely identified property and a device identifier associated with the electronic computing device, or an identity of a user of the electronic computing device, may be cross-referenced against database information such as incident information retrieved from the public safety incident information database or with CAD information retrieved from the CAD records to identify an incident or CAD record in which the uniquely identified property and the electronic computing device, or users associated therewith, are both identified. The contextual information then may include information from the identified incident or CAD record and the uniquely identified property that link them.

As one particular example with reference to FIG. 1, a local or remote database of vehicle property ownership registration information may be populated to contain an identity (e.g., such as license plate 172) of a vehicle such as vehicle 132 and an identity of a user (such as driver user 122) and source device (mobile or fixed phone number) not illustrated in FIG. 1 associated with the driver user 122 and/or vehicle 132. The vehicle 132 may subsequently, for example, be involved in an incident such as an accident in which the officer user 102 is involved as an investigating officer. A public safety incident information database or CAD record may be created to include the unique property identity (e.g., license plate 172) and an identity of the investigating officer user 102.

At some later time the driver user 122 associated with the vehicle 132 may call the officer user 102, the electronic computing device in the radio device 104 may access the respective local or remote database of vehicle property information using the device identifier of the source device (mobile device of the driver user 122 associated with vehicle 132 in this case). Once the particular vehicle 132 associated with the source device is identified (and its unique property identifier, license plate 172, retrieved), the electronic computing device in the radio device 104 may cross-reference the received unique property identifier (the license plate 172 in this case) and the unique identifier of the electronic computing device (radio 104 or officer user 102 in this case) against incident information retrieved from the public safety incident information database or with CAD information retrieved from the CAD records to identify an incident or CAD record in which the uniquely identified property and the electronic computing device, or users associated therewith, are both identified. The contextual information identified at block 412 may then include information from the identified incident or CAD record (similar to the prior example above) and the uniquely identified property (the vehicle 132, license plate 172, or other contextual information associated therewith) that links the source device to the receiving device.

In an even further example, the electronic computing device may access a local or remote database of mobile application services information using the source identifier, or a determined identity of the user of the source device, and a device identifier associated with the electronic computing device, or an identity of a user of the electronic computing device, to identify one or more application services records in which both the source identifier, or the determined identity of the user of the source device, and the electronic computing device identifier, or the identity of the user of the electronic computing device, occur in a same record, and identify additional contextual information from the same application services information record.

As one particular example with reference to FIG. 1, an application services record may indicate that a shared transportation services driver user 122 having an associated source device (not shown in FIG. 1) may have been requested and did actually provide transportation service to a passenger user 182 having an associated mobile device (not shown in FIG. 1), the pick-up location occurring at the corner of 112 St. and AB St. as shown on the street sign 170. The application services record may include the device identifier identifying the mobile device of the driver user 122 (e.g., such as the driver's mobile device MIN) and the device identifier identifying the mobile device of the passenger user 182 (e.g., such as the passenger's mobile device MIN), along with additional contextual information such as the name of the driver, location of pick-up as shown on the street sign 170, a pick-up time and date, a duration of the ride, a path taken during the ride, a drop-off location, and an amount paid for the services, among other possibilities.

In either case, and at some later time when the driver user 122 may call the passenger user 182, the electronic computing device in the passenger's mobile device may access the application services record at block 410 using the device identifiers of the source device (mobile device of the driver user 122 in this case) and the electronic computing device (passenger user's 182 mobile device in this case). The electronic computing device may then identify, at block 412, the contextual information from the respective application services record (e.g., the name of the driver, location of pick-up as shown on the street sign 170, a pick-up time and date, a duration of the ride, a path taken during the ride, a drop-off location, and an amount paid for the services, among other possibilities).

In a still further example, the electronic computing device may access a local or remote database of device location information using the source identifier, or a determined identity of the user of the source device, and a device identifier associated with the electronic computing device, or an identity of a user of the electronic computing device, to identify one or more geographic locations at which both the source device (via the source identifier), or the determined identity of the user of the source device, and the electronic computing device (via the electronic computing device identifier), or the identity of the user of the electronic computing device, occur in a same location, and identify additional contextual information from the same location record. The location specified in the location record may be GPS location, a street address, a city, a township, a village, a state, a building, a park, a shopping center, a service or repair center, or some other particularly identifiable location, structure, or area. In addition to the specified location, the location record may further contain additional contextual information regarding the specified location, such as a day of the week, a time of day, or a date at which the two devices were recorded at the same location, an identity of the location such as the name of the town, building, park, or shopping center at which the two devices were recorded, or other information.

As one particular example with reference to FIG. 1, a stored location record may indicate that an officer user 182 having an associated source device (not shown in FIG. 1) may have been at a same location (an electronics store at a particular intersection as shown on the street sign 170 and as reflected in the record) as the officer user 102 having an associated radio 104. The location record may include the device identifier identifying the mobile device of the user 182 (e.g., such as the driver's mobile device MIN) and the device identifier identifying the radio 104 of the officer user 102 (e.g., such as the radio's MIN), along with additional contextual information such as the name of the electronics store, the street address of the electronics store, a time of arrival and/or departure of the officer user 102, a time of arrival and/or departure of the officer user 182, and other contextual information regarding the location.

Subsequently, at some later time when the officer user 182 may call the officer user 102, the radio 104 may access the location record at block 410 using the device identifiers of the source device (mobile device of the officer user 182 in this case) and the electronic computing device (radio 104 in this case). The electronic computing device of the mobile radio 104 may then identify, at block 412, the contextual information from the respective location record (e.g., the name of the electronic store and the date and time at which both the officer user 102 and officer user 182 were at that location, among other possibilities).

At block 412, and in the event where the one or more local or remote databases provide a plurality of contextual informations from the local or remote databases associating the source device with the receiving device, a ranking algorithm may be employed to select which of the plurality of contextual informations from a single or multiple local or remote databases to provide to the user at subsequent block 414. For example, the electronic computing device may determine which of the contextual informations evidences a most recent interaction between the source device and the electronic computing device, may determine which contextual information evidences a highest number of interactions between the source device and the electronic computing device, or some weighting that takes both into consideration, to determine which to present to the user. For example, if contextual information is identified at block 412 from an incident record from two years ago and contextual information is also identified at block 412 from a talkgroup conversation from 2 weeks ago, the more recent talkgroup-based contextual information may be selected at block 412 for presentation. On the other hand, if contextual information is identified at block 412 from an ongoing incident investigation over the past two years (and as recent as 2 weeks ago) and contextual information is identified at block 412 from an unrelated talkgroup conversation from 1 week ago, the more prevalent incident-based contextual information may be selected at block 412 for presentation. In still other examples, a hard-coded ranking or weighting of types of contextual information or types of local or remote contextual information databases may be referenced that may, for example, prioritize public-safety incident information highest, then talkgroup information, then private call information, then application services information, such that the hard-coded ranking will determine which of multiple types of context information identified at block 412 is actually provided to the user at block 414. And in still further examples, the contextual information most closely matching a current context of the receiving device may be selected or more highly rated (e.g., if the receiving device is currently assigned to a particular incident, incident information matching that particular incident is selected as the context information, or if the receiving device is at a particular location, context information associated with that particular location is selected as the identified context information).

In addition, a filtering step may be implemented at block 412 that considers indications of an amount of interaction evidenced by the identified contextual information at step 412 to also determine how much of the identified contextual information is to be provided to the user at subsequent step 414. For example, if contextual information is identified at block 412 from an ongoing incident investigation over the past two years (indicating weekly contact and as recent as 2 weeks ago), the electronic computing device may determine that a first and last name contextual information is sufficient as the user of the electronic computing device is likely quite familiar with this person (i.e., the user associated with the source device). Whereas, if contextual information is identified at block 412 from a single unrelated talkgroup conversation from 1 week ago, the electronic computing device may determine that a first and last name and still additional contextual information such as location and date and time of the last talkgroup call should be provided since the user of the electronic computing device is likely quite unfamiliar with this person given the lower relative number of interactions.

Process 400 then proceeds to block 414, where the electronic computing device provides, at one or both of an audio and visual output of the electronic computing device and while providing the indication of and request to accept the incoming call, the identified contextual information. The audio output of the electronic computing device may be, for example, the speaker 322 and the output mechanism may include a speech-to-text output of the contextual information identified at block 412. The visual output of the electronic computing device may be, for example, the display screen 305 and the output mechanism may include a textual display of the contextual information identified at block 412, adjacent, overlaying, or otherwise displayed concurrent with the indication of and request to accept the incoming call (which may be displayed on the screen 305 or via another output mechanism such as an LED indicator or via a different modality such as the speaker 322). FIG. 5 illustrates an example of the contextual information 516 displayed in a contextual information box adjacent the visual indication of the incoming call 508 and adjacent the request to accept 512 or reject 514 the incoming call. While FIG. 5 illustrates an example where public safety incident information or CAD records provide the contextual information displayed, in other embodiments, different or additional identified contextual information from block 412 may be displayed consistent with the various other examples set forth herein and their equivalents.

In some embodiments, the identified contextual information may be stored into the locally stored address book as associated with the source identifier, whether the call is accepted or whether the call is rejected, so that future phone calls will not require additional database look-ups to provide the contextual information at block 414. In still other embodiments, the identified contextual information may be stored into the locally stored address book associated with the source identifier only if the call is accepted, and in some embodiments, the electronic computing device may prompt a user at the completion of the call to one or both of (and individually or in a single prompt) confirm the accuracy of the contextual information and to store the contextual information into to the locally stored address book as associated with the source identifier.

In still other embodiments, an intervening electronic computing device between the source device (such as the mobile device of user 182) and the receiving device (such as the mobile radio 104) in the system 100 may perform one or more of blocks 402-414, such as including but not limited to the controller 156, the dispatch console 158, and/or the cloud computer cluster 162, and may cause the contextual information to be provided to the electronic computing device/receiving device immediately before, immediately after, or with the incoming call transmission notification transmitted to the receiving device consistent with the aforementioned disclosure. For example, the controller 156 may receive a call request from a source device such as the mobile device of user 182 to establish a call with mobile radio 104, may preform one or more of blocks 404, 408, 410, and 412, perhaps with access to a locally or remotely stored call history database and/or address book associated with the mobile radio 104 and perhaps with access to one or more hardware or network identifier databases or mappings to obtain additional associated identifiers of the source and receiving devices as noted earlier, and may obtain the identified contextual information at step 412 and provide it to the mobile radio 104 immediately before, immediately after, or with a forwarded incoming call transmission notification (the same notification as received or modified to indicate the infrastructure as the source, among other possible modifications) transmitted to the mobile radio 104. The mobile radio 104 may then receive the forwarded incoming call notification from the infrastructure and the identified contextual information, and substantially simultaneously display both the indication and the request to accept as set forth at block 406 and the contextual information as set forth at block 414. In those examples where the contextual information is provided immediately before or with the incoming call transmission notification, this may prevent the receiving device from having to establish a secondary wireless connection to access remote databases where such data transmissions are not supported over the established voice channel, among other advantages.

In a still further embodiment, and after a threshold time period to answer the incoming call passes (e.g., such as 5-15 s) without receiving user input from the user of the receiving/electronic computing device accepting the call, or perhaps after receiving user input from the user of the receiving/electronic computing device rejecting the call, the electronic computing device may provide a missed call notification at a display, such as display 504, of the electronic computing device that includes the source identifier and the identified contextual information, and may provide a user interface option to initiate a call back to the source device. Other examples are possible as well.

In an embodiment in which the receiving/electronic computing device is a PSAP call taking position (computing device operated by a different user than an initial or prior call from the same source device) or a dispatch center dispatch console position (computing device operated by a different user than an initial or prior call from the same source device), block 414 may further include a step of determining, based on the identified contextual information, fs one of the other PSAP call taking positions or dispatch center dispatch console positions has an operator better suited or better aligned to taking the call and, if so, transferring the incoming call and providing the identified contextual information to a second different PSAP call taking position or dispatch center dispatch console position. For example, if contextual information for an incoming call is identified at step 412 that indicates that the source device and a different PSAP call taking position (or user associated therewith) or a different dispatch center dispatch console position (or user associated therewith), having the same network identifier as indicated by the source device for the incoming call, e.g., 9-1-1 or some equivalent, was previously involved in a prior incident or prior call, in accordance with one of the databases identified above, the incoming call may be transferred to the different PSAP call taking position (or user associated therewith) or different dispatch center dispatch console position (or user associated therewith) and the identified contextual information provided to the different PSAP call taking position or different dispatch center dispatch console position.

3. Conclusion

In accordance with the foregoing, an improved device, method, and system is disclosed for a call-receiving electronic computing device to efficiently and dynamically electronically obtain additional contextual electronic information regarding a determined unknown or first time-caller that allows a user of the call-receiving electronic computing device to be able to make a more informed decision of whether to accept or reject an incoming call, and also allows the call-receiving electronic computing device to automatically, and with little or no user action on the receiving device's user's behalf, to populate a locally stored address book with relevant contextual information with respect to past electronically stored interactions between the source device and the receiving device, improving a user experience and minimizing an amount of searching and data entry conventionally required by the receiving device user, and reducing an amount of power consumption expended by the receiving device while the receiving device user operates the user interface to manually search for, find, and enter such contextual information into a locally stored address book. Other features and advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for electronically retrieving and displaying contextual information for determined unknown or unfamiliar callers during an incoming call from a source device to a receiving device, the method comprising:

receiving, at an electronic processor of the receiving device, an incoming call transmission notification signal associated with the incoming call requesting that a call be established between the receiving device and the source device;

identifying, by the electronic processor via the incoming call transmission notification signal, a source identifier identifying a network or hardware address associated with the source device initiating the incoming call to the receiving device;

providing, by the electronic processor, an indication of the incoming call and a request to accept the incoming call at an output interface of the receiving device, a positive response to which will cause the incoming call to be accepted and allow audio and/or video data captured at one of the receiving device and the source device to be provided to the other of the receiving device and the source device over a wired and/or wireless network communicably connecting the source device to the receiving device;

determining, by the electronic processor, that one of (i) this is a first time that the source device having the source identifier has called this receiving device, (ii) a local address book of the receiving device stored at the receiving device does not include the source device having the source identifier, and (iii) the local address book includes the source device having the source identifier but does not include any associated contextual information including a friendly name associated with a user of the source device to aid a second user of the receiving device in identifying the user of the source device, and responsively:

accessing, by the electronic processor, one or more local or remote databases of public safety incident information, talkgroup membership and historical talkgroup call information, vehicle registration information, computer aided dispatch (CAD) records, private call historical information, mobile application historical service information, and historical location information;

identifying, via the one or more local or remote databases using the source identifier of the source device and a destination identifier of the receiving device, contextual information from the local or remote databases associating the source device with the receiving device; and providing, at one or both of an audio and visual output of the receiving device and while providing the indication of and request to accept the incoming call, the identified contextual information.

2. The method of claim 1, wherein the step of determining that one of (i) this is the first time that the source device having the source identifier has called this receiving device, (ii) the local address book of the receiving device stored at the receiving device does not include the source device having the source identifier, and (iii) the local address book includes the source device having the source identifier but does not include any associated contextual information including the friendly name associated with the user of the source device for help in identifying the user of the source device comprises determining that this is the first time that the source device having the source identifier has called this receiving device.

3. The method of claim 2, wherein determining that this is the first time that the source device having the source identifier has called this receiving device comprises accessing a call history log stored at the receiving device and failing to find a match between the source identifier from the incoming call transmission notification signal and source identifiers stored in the call history log.

4. The method of claim 1, wherein the step of determining that one of (i) this is the first time that the source device having the source identifier has called this receiving device, (ii) the local address book of the receiving device stored at the receiving device does not include the source device having the source identifier, and (iii) the local address book includes the source device having the source identifier but does not include any associated contextual information including the friendly name associated with the user of the source device for help in identifying the user of the source device comprises determining that the local address book of the receiving device stored at the receiving device does not include the source device having the source identifier.

5. The method of claim 4, wherein determining that the local address book of the receiving device stored at the receiving device does not include the source device having the source identifier comprises accessing the local address book stored at the receiving device including a plurality of source identifiers and associated friendly name information identifying users associated with some source identifiers and failing to find a match between the source identifier from the incoming call transmission notification signal and source identifiers stored in the local address book.

6. The method of claim 1, wherein the step of determining that one of (i) this is the first time that the source device having the source identifier has called this receiving device, (ii) the local address book of the receiving device stored at the receiving device does not include the source device having the source identifier, and (iii) the local address book includes the source device having the source identifier but does not include any associated contextual information including the friendly name associated with the user of the source device for help in identifying the user of the source device comprises determining that the local address book includes the source device having the source identifier but does not include any associated contextual information or the friendly name associated with the user of the source device for help in identifying the user of the source device.

7. The method of claim 6, wherein determining that the local address book includes the source device having the source identifier but does not include any associated contextual information including the friendly name information associated with the user of the source device for help in identifying the user of the source device comprises accessing the local address book stored at the receiving device including a plurality of source identifiers and associated friendly name information identifying users associated with some source identifiers, finding a match between the source identifier from the incoming call transmission notification signal and a particular source identifier stored in the local address book, and failing to locate any associated contextual information including friendly name information associated with the particular source identifier in the local address book.

8. The method of claim 1, wherein the step of accessing one or more local or remote databases of public safety incident information, talkgroup membership and call information, vehicle registration information, CAD records, private call history information, mobile application historical service information, and/or historical location information comprises accessing a local or remote database of public safety incident information using the source identifier, or a determined identity of the user of the source device, and a receiving device identifier associated with the receiving device, or an identity of the second user of the receiving device, to identify one or more incidents contained in the public safety incident information in which both the source identifier, or the determined identity of the user of the source device, and the receiving device identifier, or the identity of the second user of the receiving device, occur in a same incident record, and wherein the contextual information comprises incident information retrieved from the same incident record.

9. The method of claim 8, wherein the contextual information comprises a role of the user of the source device indicated in the same incident record, the role selected from one of an actual or potential suspect, an actual or potential witness, a 911 caller, an investigating officer, a CAD operator, a medical professional, and a laboratory analyst.

10. The method of claim 1, wherein the step of accessing one or more local or remote databases of public safety incident information, talkgroup membership and call information, vehicle registration information, CAD records, private call history information, mobile application historical service information, and/or historical location information comprises accessing a local or remote database of talkgroup call and membership information or private call history information, to identify one or more historical talkgroup calls via the talkgroup call and membership information or one or more historical private calls via the private call history information that both the source identifier, or a determined identity of the user of the source device, and the receiving device identifier, or an identity of the second user of the receiving device, participated, and wherein the contextual information comprises respective historical talkgroup call information identifying a date and talkgroup metadata of the identified historical talkgroup call in which both participated or respective private call information identifying a date and time of the identified historical private call in which both participated.

11. The method of claim 10, wherein the contextual information further comprises location information identifying a location of the receiving device when the respective identified historical talkgroup call or private call occurred.

12. The method of claim 1, wherein the step of accessing one or more local or remote databases of public safety incident information, talkgroup membership and call information, vehicle registration information, CAD records, private call history information, mobile application historical service information, and/or historical location information comprises accessing a local or remote database of historical location information that includes first historical locations of the source device, or of the user of the source device, and second historical locations of the receiver device, or of the second user of the receiver device, and wherein the contextual information comprises shared location information identifying one or more substantially overlapping first and second historical locations at substantially overlapping times.

13. The method of claim 1, wherein the step of accessing one or more local or remote databases of public safety incident information, talkgroup membership and call information, vehicle registration information, CAD records, private call history information, mobile application historical service information, and/or historical location information comprises accessing a local or remote vehicle registration database that includes vehicle and owner information, and wherein the contextual information comprises one of vehicle and owner information retrieved from the vehicle registration database using the source identifier of the source device, or a determined user of the source device; and
  cross-referencing, by the electronic processor, the one of the vehicle and owner information retrieved from the vehicle registration database with incident information retrieved from the public safety incident information database or with CAD information retrieved from the CAD records to identify an incident or CAD record in which the source device and the receiving device, or users associated therewith, are both identified, and wherein the contextual information further comprises information from the identified incident or CAD record.

14. The method of claim 1, wherein the step of accessing one or more local or remote databases of public safety incident information, talkgroup membership and call information, vehicle registration information, CAD records, private call history information, mobile application historical service information, and/or historical location information comprises accessing a local or remote database of mobile application historical service information using the source identifier, or a determined identity of the user of the source device, and a receiving device identifier associated with the receiving device, or an identity of the second user of the receiving device, to identify one or more mobile application services in which both the source identifier, or the determined identity of the user of the source device, and the receiving device identifier, or the identity of the second user of the receiving device, occur in a same mobile application services record, and wherein the contextual information comprises mobile application service information identified a particular mobile application and particular service performed from the same mobile application services record.

15. The method of claim 1, wherein the step of providing, via one or both of the audio and visual output of the receiving device and prior to the second user of the receiving device accepting or rejecting the incoming call, the identified contextual information comprises providing the identified contextual information at a display screen of the receiving device.

16. The method of claim 15, further comprising, after the incoming call is answered, providing an input interface on the display screen via which the second user of the receiving device may indicate whether the identified contextual information is accurate relative to the source device or user associated of the source device, and responsive to receiving user input indicating that the identified contextual information is accurate, storing the identified contextual information in the local address book of the receiving device.

17. The method of claim 1, wherein the incoming call is a talkgroup call, and the incoming call transmission notification signal identifies an initial talker granted a floor in the talkgroup call.

18. The method of claim 1, wherein one of after a threshold time period to answer the incoming call passes without receiving user input from the second user of the receiving device accepting the call and the second user of the receiving device providing user input denying the incoming call, providing a missed call notification at a display of the receiving device that includes the source identifier and the identified contextual information.

19. A receiving device for electronically retrieving and displaying contextual information for determined unknown or unfamiliar callers during an incoming call from a source device to the receiving device, the receiving device comprising:
  a memory;
  one or more transceivers;
  an output interface; and
  one or more processors configured to:
    receive, via the one or more transceivers, an incoming call transmission notification signal associated with the incoming call requesting that a call be established between the receiving device and the source device;
    identify, via the incoming call transmission notification signal, a source identifier identifying a network or hardware address associated with the source device initiating the incoming call to the receiving device;
    provide, via the output interface, an indication of the incoming call and a request to accept the incoming call, a positive response to which will cause the incoming call to be accepted and allow audio and/or video data captured at one of the receiving device and the source device to be provided to the other of the receiving device and the source device over a wired and/or wireless network communicably connecting the source device to the receiving device;
    determine that one of (i) this is a first time that the source device having the source identifier has called this receiving device, (ii) a local address book of the receiving device stored at the receiving device does not include the source device having the source identifier, and (iii) the local address book includes the source device having the source identifier but does not include any associated contextual information including a friendly name associated with a user of the source device to aid a second user of the receiving device in identifying the user of the source device, and responsively:
      access one or more local or remote databases of public safety incident information, talkgroup membership and historical talkgroup call information, vehicle registration information, computer aided dispatch (CAD) records, private call historical information, mobile application historical service information, and historical location information;
    identify, via the one or more local or remote databases using the source identifier of the source device and a destination identifier of the receiving device, contextual information from the local or remote databases associating the source device with the receiving device; and
    provide, via the output interface and while providing the indication of and request to accept the incoming call, the identified contextual information.

20. A system for electronically retrieving and displaying contextual information for determined unknown or unfamiliar callers during an incoming call from a source device to a receiving device, the system comprising:
  one or more infrastructure electronic processing devices configured to:
    receive, at the one or more infrastructure electronic processing devices, an incoming call transmission notification signal associated with the incoming call requesting that a call be established between the receiving device and the source device;
    identify, by the one or more infrastructure electronic processing devices via the incoming call transmission notification signal, a source identifier identifying a network or hardware address associated with the source device initiating the incoming call to the receiving device and identify, via the incoming call transmission notification signal, a destination identifier identifying a second network or second hardware address associated with the receiving device;
    determine, by the one or more infrastructure electronic processing devices, that one of (i) this is a first time that the source device having the source identifier has called the receiving device, (ii) an address book of the receiving device stored in the infrastructure does not include the source device having the source identifier, and (iii) the address book of the receiving device stored in the infrastructure includes the source device having the source identifier but does not include any associated contextual information including a friendly name associated with a user of the source device to aid a second user of the receiving device in identifying the user of the source device, and responsively:
      access, by the one or more infrastructure electronic processing devices, one or more local or remote databases of public safety incident information, talkgroup membership and historical talkgroup call information, vehicle registration information, computer aided dispatch (CAD) records, private call historical information, mobile application historical service information, and historical location information;
    identify, via the one or more local or remote databases using the source identifier of the source device and the destination identifier of the receiving device, contextual information from the local or remote databases associating the source device with the receiving device; and
    provide, via one or more wired or wireless infrastructure links, the identified contextual information and a forwarded incoming call notification to the receiving device; and a receiving device having one or more receiving device electronic processing devices configured to:
    receive, by the one or more receiving device electronic processing devices, the forwarded incoming call notification and the identified contextual information; and
    provide, by one or more receiving device electronic processing devices via an output interface of the receiving device, a request to accept the incoming call at the output interface of the receiving device, a positive response to which will cause the incoming call to be accepted and allow audio and/or video data captured at one of the receiving device and the source device to be provided to the other of the receiving device and the source device over a wired and/or wireless network communicably connecting the source device to the receiving device.

\* \* \* \* \*